Figure 16:
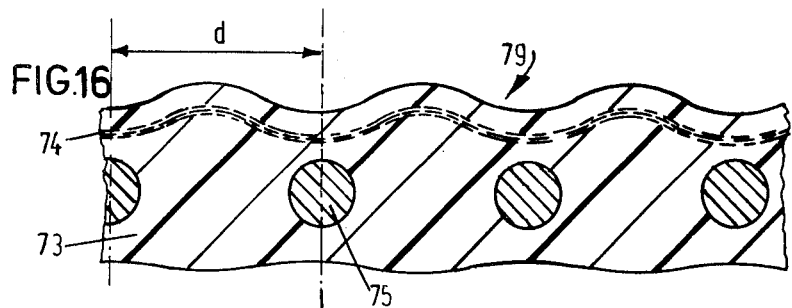

United States Patent [19]
De Koning et al.

[11] 4,123,860
[45] Nov. 7, 1978

[54] FLEXIBLE CONNECTIONS FOR SUCTION DREDGER PIPES

[75] Inventors: Jan De Koning, Amsterdam; Theodorus Van Den Brink, Nieuwegein; Tjako A. Wolters, Zeist, all of Netherlands

[73] Assignee: Ballast-Nedam Groep N.V., Amstelveen, Netherlands

[21] Appl. No.: 822,921

[22] Filed: Aug. 8, 1977

Related U.S. Application Data

[62] Division of Ser. No. 675,167, Apr. 8, 1976, Pat. No. 4,083,135.

[30] Foreign Application Priority Data

Apr. 15, 1975 [NL] Netherlands ............... 7504493
Apr. 15, 1975 [NL] Netherlands ............... 7504489

[51] Int. Cl.² ..................................... E02F 3/90
[52] U.S. Cl. ...................................... 37/72; 138/122; 138/DIG. 5; 285/114; 285/137 R; 285/227

[58] Field of Search ............. 285/31, 227, 226, 114, 285/131, 137 R, 137 A; 29/446, 454; 138/DIG. 5, 122

[56] References Cited

U.S. PATENT DOCUMENTS

3,828,451   8/1974   De Koning et al. ............ 285/227 X

OTHER PUBLICATIONS

Anaconda Bulletin AX-97; "AX Tubing for Tough Expansion Problems;" 4 pages; Copyright 1959.

*Primary Examiner*—Clifford D. Crowder
*Attorney, Agent, or Firm*—John P. Snyder

[57] ABSTRACT

Rigid pipe sections of a dredger are pivotally connected to allow universal movement therebetween and a flexible, elastic bellows communicates the adjacent ends of the pipe sections. The bellows in its free state is pre-stressed so as to be under compression and is further compressed when in place between the ends of the pipe sections.

5 Claims, 19 Drawing Figures

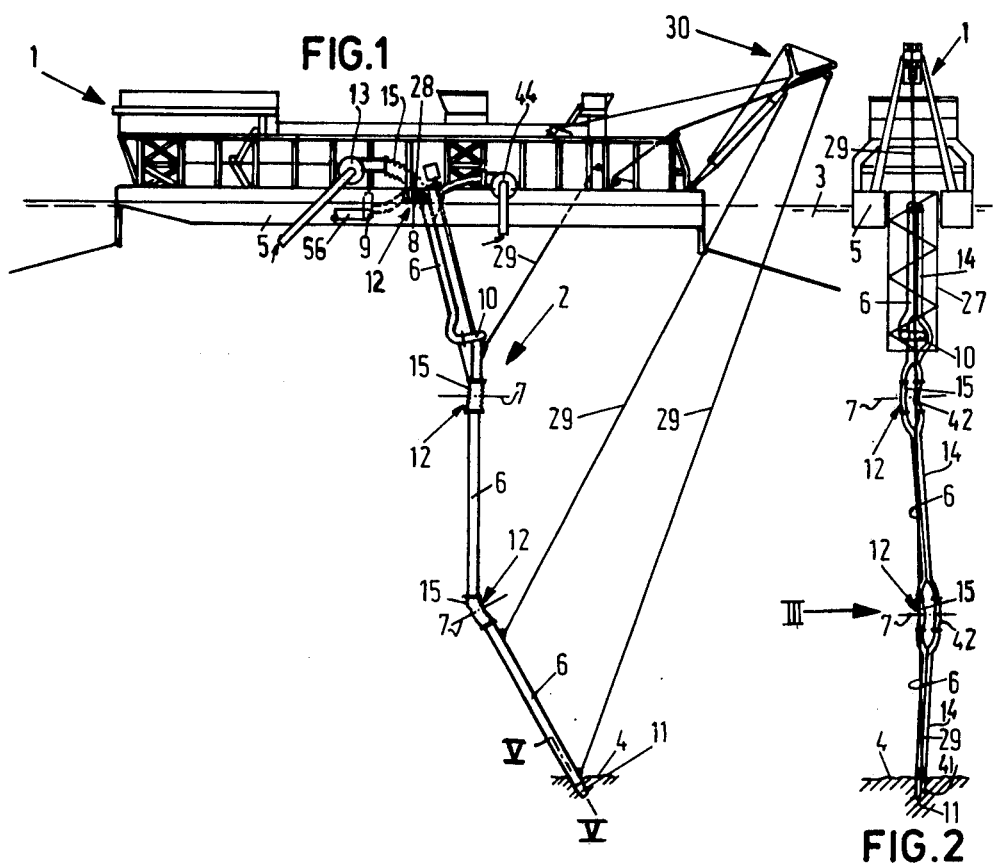

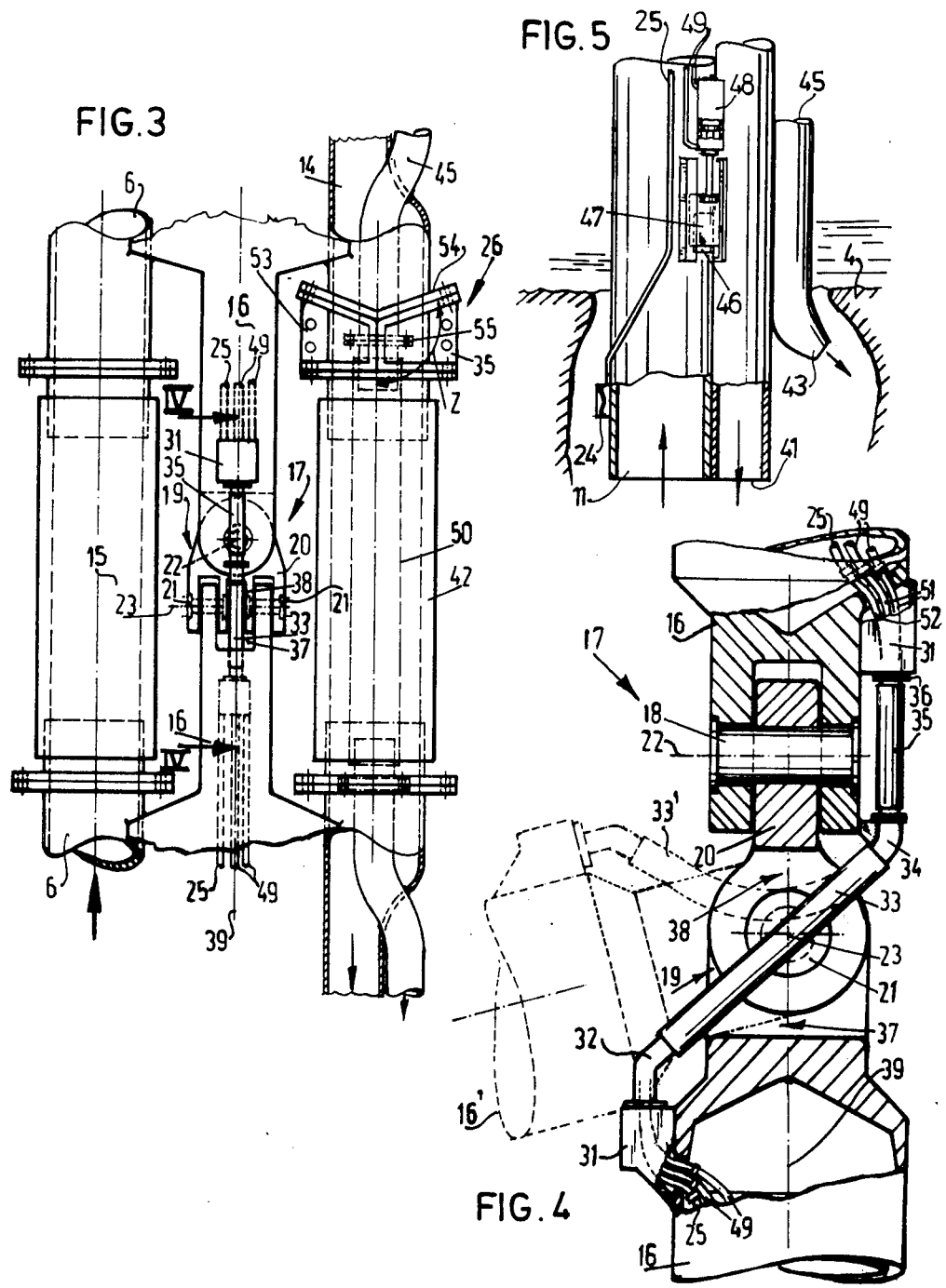

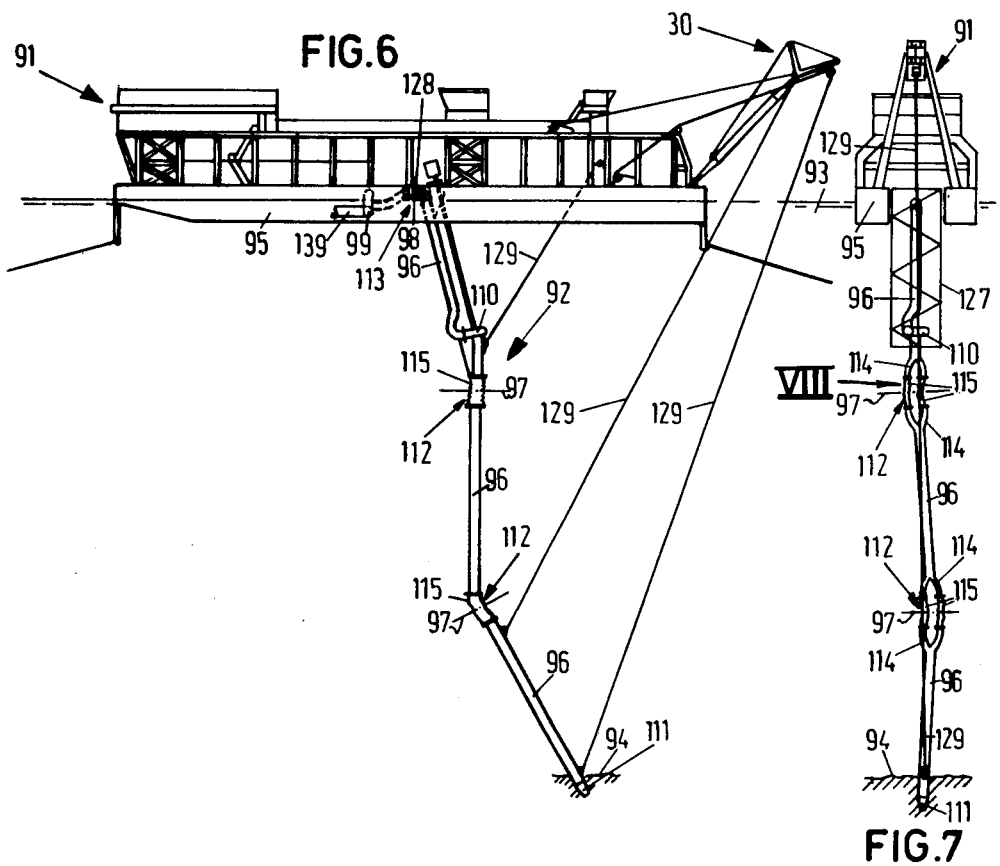

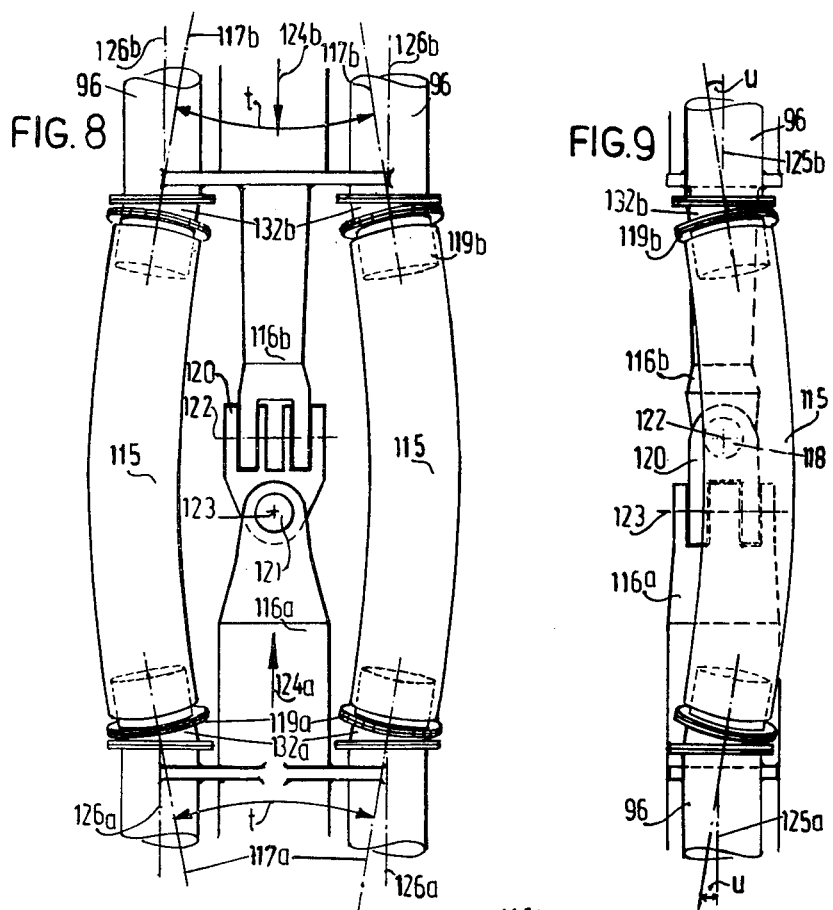
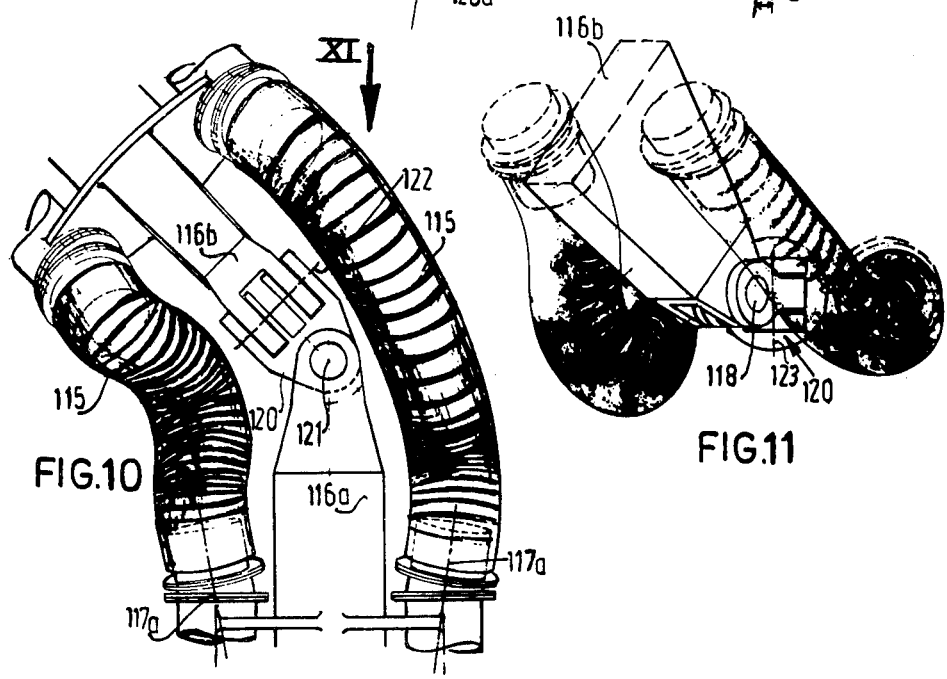

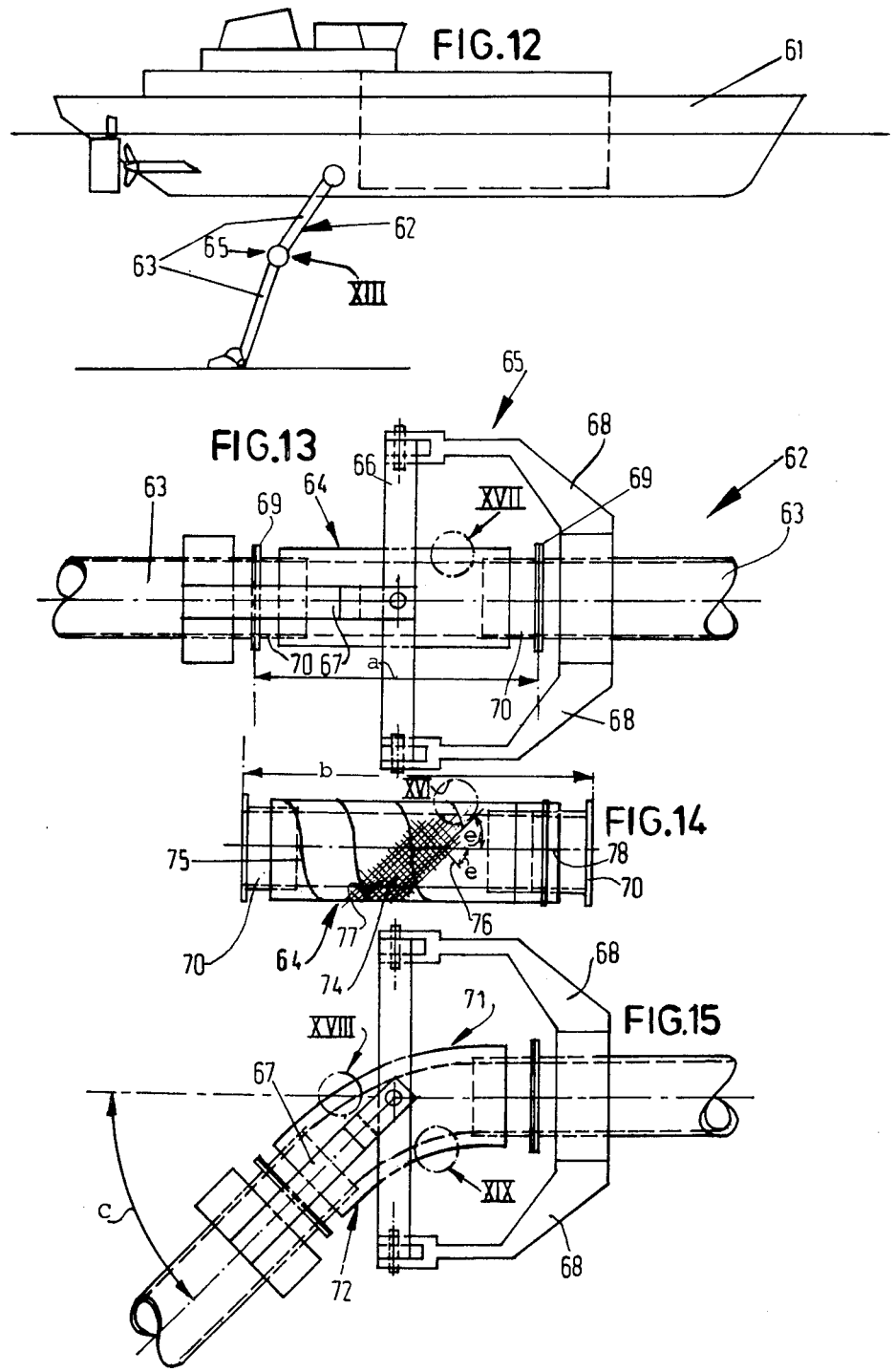

FLEXIBLE CONNECTIONS FOR SUCTION DREDGER PIPES

This is a division, of application Ser. No. 675,167 filed Apr. 8, 1976, now U.S. Pat. No. 4,083,135.

The invention relates to a suction dredger having a dredging pipe which comprises at least two relatively pivotable rigid portions and an intermediate flexible portion.

In a known suction dredger of this kind the flexible portion is torn up in the event of a large angular turn of the pipe portions even when said flexible portion is made of reinforced elastic material.

The invention has for its object to enlarge the permissible relative angle of turn between the portions. For this purpose in the suction dredger comprising a pipe system for sucking up earth from a ground under water, said pipe system comprising a plurality of pipe sections connected by means of connecting members so as to be universally pivotable with respect to one another, said connecting members comprising at least one universal joint formed by hinge parts forming a cardan joint and coupling means and at least two bellows arranged one on each side of the cardan joint and communicatively connecting with one another the rigid pipe sections, the flexible pipe portion is arranged between the portions in a prestressed and compressed state.

The invention particularly relates to a suction dredger comprising a pipe system for sucking up earth from a ground under water, said pipe system comprising a plurality of pipe sections connected by means of connecting members so as to be universally pivotable with respect to one another, said connecting members comprising at least one universal joint formed by hinge parts forming a cardan joint and coupling means and at least two bellows arranged one on each side of the cardan joint and communicatively connecting with one another the rigid pipe sections.

Such a suction dredger is known.

The suction dredger in which diluting water and/or disintegrating water has to be added to the ground and in addition the lower suction pipe sections of the pipe system are remote-controlled, for example, by means of hydraulic pressure ducts and/or measuring value pick-ups are provided below on the suction pipe and have their electrical and/or hydraulic conduits passed to the vessel, comprises additional ducts. In order to avoid damage of the additional ducts at the area of the pivotal joint, the known suction dredger is improved by passing at least one flexible duct for causing the additional ducts arranged at the side of the pipe sections to communicate with one another across the cardan joint.

Particularly for passing thin measuring conductors and/or hydraulic ducts across the connecting members a preferred embodiment of the suction dredger in accordance with the invention is characterized in that the flexible duct comprises a hose extending through coupling means and at least one hinge part of the universal joint.

Since the total quantity of water to be fed is smaller than the quantity of suspension of earth and water to be sucked up and since it is advantageous to use equally proportional bellows on either side of the universal joint, the suction dredger according to the invention comprises preferably a flexible duct comprising a hose extending inside the bellows in the direction of length thereof.

The invention further relates to a suction dredger comprising a pipe system for sucking up earth from a bottom beneath the water, said pipe system comprising a plurality of rigid pipe sections pivoted to one another by means of universal joints with hinge parts and communicating with one another through flexible, elastic bellows, whilst at the area of at least one universal joint two of said bellows are arranged side by side and the universal joint is disposed between the two adjacent bellows.

In said known suction dredger the universal joints are each allowed to turn only to a limited extent in the plane of the pipe sections, since they would otherwise come into contact with the bellows and damage the same.

The invention has further for its object to enable a larger turn of the universal joints in said plane. The invention provides an improvement in the suction dredger comprising a pipe system for sucking up earth from a bottom beneath the water, said pipe system comprising a plurality of rigid pipe sections pivoted to one another by means of universal joints with hinge parts and communicating with one another through flexible, elastic bellows, whilst at the area of at least one universal joint two of said bellows are arranged side by side and the universal joint is disposed between the two adjacent bellows, in that the axial directions of the two bellows ends rigidly secured to the same hinge part are diverging towards the universal joint.

The aforesaid and further features of the invention will now be described with reference to a drawing.

Figure 17:
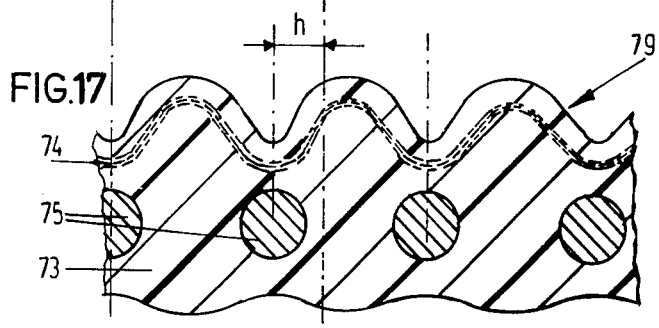
Figure 18:
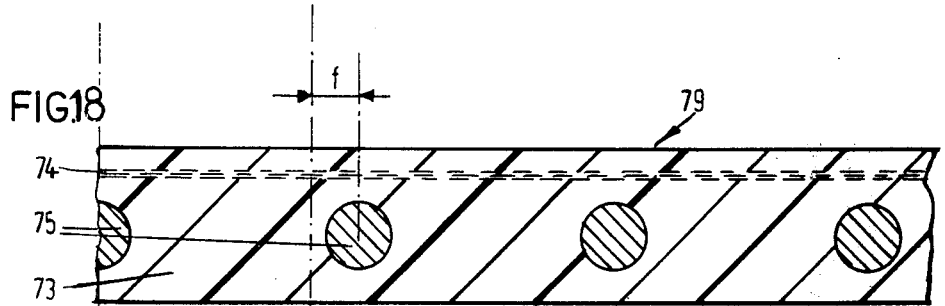
Figure 19:
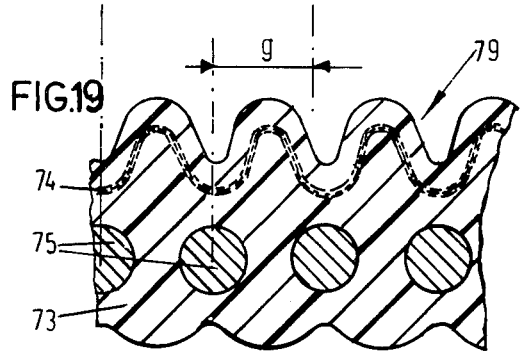

In the drawing:

FIGS. 1 and 2 show schematically a side elevation and a front view respectively of a suction dredger in accordance with the invention, FIG. 3 shows on an enlarged scale a detail III in FIG. 2, FIG. 4 is an enlarged sectional view taken on the line IV—IV in FIG. 3, FIG. 5 is an enlarged sectional view taken on the line V—V in FIG. 1, FIGS. 6 and 7 are a side elevation and a front elevation respectively of a suction dredger in accordance with the invention, FIG. 8 shows on an enlarged scale detail VIII in FIG. 7, FIG. 9 is a side elevation of the detail of FIG. 8, FIG. 10 is an elevational view like FIG. 8, the universal joint being turned through 45° in two orthogonal directions, FIG. 11 is an elevational view taken in the direction of the arrow XI in FIG. 10, FIG. 12 is a side elevation of a dredger having a dredging pipe in accordance with the invention, FIGS. 13 and 15 are enlarged side elevations of a part XIII in FIG. 12, the dredging pipe being in a stretched and a curved state respectively, FIG. 14 is a side elevation of a dismounted, flexible portion of the dredging pipe shown in FIG. 13, FIG. 16 is a sectional view of a part XVI in FIG. 14, FIG. 17 is a sectional view of a part XVII in FIG. 13, FIG. 18 is a sectional view of a part XVIII in FIG. 15, and FIG. 19 is a sectional view of a part XIX in FIG. 15.

The suction dredger 1 shown in FIGS. 1 and 2 comprises a vessel 5 and a pipe system 2 suspended thereto for sucking up earth from a ground 4 under the water 3. This pipe system 2 comprises three rigid pipe sections 6 and three parallel, rigid pipe sections 14 rigidly secured to the former and adapted by means of connecting members 12 to pivot universally with respect to one another about pivotal lines 7 and universally with respect to the vessel 5 about a pivotal line 8. The lower pipe section 6 comprises a nozzle 11 to be inserted into the ground 14, through which a suspension of earth and water is sucked into the lower pipe section 6 and a water outlet 41 arranged on the lower pipe section 14. The pipe sections 6 communicate at the area of the connecting members 12 with one another through intermediate bellows 15. The pipe sections 14 also communicate at this area with one another through bellows 42. The bellows 15 and 42 are elastic, flexible, extensible and compressible. The connecting members 12 comprise each a universal joint 17 having fork-shaped hinge parts 16 rigidly secured to the pipe sections 6 and 14 and coupling means 19. The coupling means 19 are formed by a pivot part 20, which is pivotally connected with the two hinge parts 16 so as to turn about two orthogonal axes 22 and 23 with the aid of a pin 18 and two coaxial pins 21.

The pipe system 2 comprises an underwater pump 10, which, together with the upper pipe section 6 and the upper pipe section 14 connected therewith, is rigidly secured to a frame 27, which is suspended to the vessel 5 so as to be pivotable about an axis 8. The upper pipe section 6 communicates through a bellows 28 with a pump 9 arranged in the vessel 5 and conveying on the suspension through a pressure duct 56. The upper pipe section 14 communicates through a bellows 15 with a water pump 13 arranged in the vessel 5 and sucking up water 3 and pumping it through the pipe sections 14 and the water outlet 41 into the ground 4 in order to dilute the suspension to be sucked up. The frame 27 and the rigid pipe sections 6 and 14 are suspended furthermore by means of cables 29 of hoisting devices 30 on the vessel 5 to said vessel 5.

The lower pipe section 6 shown in FIG. 5 is provided with a water syringe 43, by which pressurized water is injected into the ground 4 from a water pump 44 on the vessel 5 through a series of additional pipes 45 arranged at the side of the pipe sections 6 and 14 in order to disintegrate the earth 4 to be sucked up. The lower pipe section 6 furthermore has a water inlet 46, which is controllable by means of a closing member 47 governed by a hydraulic cylinder 48 in order to allow a greater or lesser quantity of water 3 to pass into the pipe section 6. Two series of additional ducts 49 establish the communication between the hydraulic cylinder 48 and control-means (not shown) arranged on the vessel 5.

The lower pipe section 6 is provided with a pressure pick-up 24 for measuring the pressure in the ground 4. The pressure pick-up 24 is connected through a series of additional ducts 25 with a meter (not shown) on the vessel 5.

According to the invention the additional pipes 45, 49 and 25 of each series communicate with one another through flexible ducts 50, 51 and 52 respectively formed by hoses.

The pipes 45 extend near the connecting members 12 as far as into the pipe sections 14, where they communicate with one another through a flexible duct 50 extending inside the bellows 42 in the direction of length thereof. As shown in FIG. 3 the bellows 42 is coupled at one end with a pipe section 14 by means of a coupling pipe 26 divided in the direction of length into two portions 53, said pipe having a flange 54, which is at an obtuse angle z to the axial direction of the coupling pipe 26 in order to allow easy dismounting of the bellows 42 for rendering accessible the connections 55 of the flexible duct 50.

Each hinge part 16 is provided with a collecting box 31 in which two additional ducts 49 and one additional duct 25 are connected with flexible ducts 51 and 52 formed by hoses. The two collecting boxes 31 communicate with one another by means of a duct enveloping the flexible ducts 51 and 52 respectively and formed by a rigid connecting pipe 32, a hose 33, a rigid coupling pipe 34, a hose 35 and a connecting pipe 36.

The hose 33 extends across a recess 37 of the hinge part 16, across a recess 38 of the hinge part 20 and between the two pins 21 so that it intersects at right angles the axis 23 in the central longitudinal plane 39 of one hinge part 16, whereas the hose 35 intersects at right angles the axis 22 near the other hinge part 16. In that the flexible ducts 51 and 52 of the additional ducts 25 and 49 extend thus across the universal joint 17 the prolongation and the shortening respectively of said flexible ducts 51 and 52 are small.

The suction dredger 91 shown in FIGS. 6 and 7 comprises a vessel 95 and a pipe system 92 suspended thereto for sucking up earth from a bottom 94 beneath the water 93. This pipe system 92 comprises three rigid pipe sections 96, which are pivoted to one another by means of universal joints 112 with pivotal axes 97 and suspended to the vessel 95 so as to be pivotable about the pivotal axis 98 by means of a universal joint 113. The pipe system 92 comprises a nozzle 111 to be inserted into the ground 94, through which a suspension of earth and water is sucked into the pipe system 92. The pipe sections 96 communicate with one another at the areas of the joints 112 through interposed bellows 115. Each joint 112 comprises fork-shaped hinge parts 116a and 116b, rigidly secured to the pipe sections 96 and interconnected by means of a pivotal member 120 and orthogonal pins 118 and 121. The bellows 115 are elastic, flexible, extensible and compressible. The universal joint 112 is arranged between the two neighbouring bellows 115, the universal joint 112 thus being compact.

The pipe system 92 comprises an immersed pump 110, which is rigidly secured together with the upper pipe section 96 to a frame 127, which is suspended to the vessel 95 so as to be pivotable about the pivotal axis 98. The upper pipe section 96 communicates through a bellows 128 with a pump 99 arranged on the vessel 95 for conveying the suspension further through a pressure duct 139.

The frame 127 and the rigid pipe sections 96 are furthermore suspended to the vessel 95 by means of cables 129 of lifting devices 130.

According to the invention the axial directions 117a of the two bellows ends 119a rigidly secured to the same hinge part 116a diverge at an angle t, viewed in the direction 124a, towards the universal joint 112. Likewise the axial directions 117b of the two bellows ends 119b rigidly secured to the same hinge part 116b diverge at an angle t, viewed in the direction 124b, towards the universal joint 112. The axial directions 117a and 117b of the bellows ends 119a and 119b respectively are at an acute angle u to the plane 125a and 125b respectively going through the centre lines 126a and 126b respectively of the two rigid pipe sections 96 rigidly secured to the same hinge part 116a and 116b respectively as the bellows ends 119a and 119b respectively. The bellows ends 119a and 119b are connected by means of inclined connecting pieces 132a and 132b respectively with the associated rigid pipe sections 96. Owing to the divergence of the directions 117a and 117b the bellows 115 remain free of the universal joint 112, when the hinge parts 116a and 116b perform a relative turn. Even an angular displacement of 30° is allowed.

FIGS. 10 and 11 show that the hinge part 116b with the pipe sections 96 rigidly secured thereto is turned even through an angle of 45° both about the axial line 123 and the axial line 122. This is enabled by arranging the bellows 115 in a compressed state between the rigid pipe sections 96.

The dredger 61 of FIGS. 12 to 15 comprises a dredging pipe 62 having two rigid portions 63 and an intermediate flexible pipe portion 64. The portions 63 are pivotally interconnected by means of a universal joint 65 formed by a ring 66 and two pairs of brackets 67 and 68, each of which pivotally engages the ring 66 on one side and which are rigidly secured to a portion 63 on the other side. Between the flanges 69 of the portions 63 the flexible pipe portion 64 is arranged by its flanges 70 in a compressed state. The length $a$ of the flexible pipe portion 64 in the mounted state is considerably smaller than the length $b$ of the flexible pipe portion 64 in the unstressed state, when dismounted, as illustrated in FIG. 14.

FIG. 15 shows the maximum permissible relative angular turn $c$ of, for example, 45° between the portions 63. The upper wall 71 of the flexible pipe portion 64 is then stretched, whereas the lower wall 72 is compressed.

The wall of the flexible pipe portion 64 consists of canvas-reinforced, elastic material 73, for example, rubber armoured by a metal tissue 74 of crossed metal wires ds in an arcuate plane. Thus, before being mounted, the elastic material 73 is prestressed under compression and, as is illustrated in FIG. 17, when the bellows is mounted between the aligned pipe sections (FIG. 13), the elastic material is further compressed. Owing to the arcuate shape of the tissue 74 and to the angle $e$ between the tissue wires 76 and 77 and the longitudinal axis 78 the wall 79 of the flexible pipe portion 64 may experience a maximum prolongation $f$ of the pitch $d$ into the state shown in FIG. 18. Owing to the high degree of compressibility of the elastic material 73 the wall 79 can exhibit a maximum shortening $g$ of the pitch $d$ into the state shown in FIG. 19. The maximum prolongation $f$, for example, 10 to 20% of the wall 79 is considerably smaller than the maximum shortening $g$, for example, 70%. The prestressed flexible pipe portion 64 is arranged in accordance with the invention in a further compressed state between the portions 63 so that a large angular displacement of the portions 63 is allowed before the wall 79 is stretched to its maximum length. This prestressed state, in which the pitch $d$ is shortened by a value $h$ is illustrated in FIG. 17.

What we claim is:

1. A suction dredger comprising a pipe system for sucking up earth from a bottom beneath the water, said pipe system comprising a plurality of rigid pipe sections pivoted to one another by means of universal joints with hinge parts and communicating with one another through flexible, elastic bellows, two of said bellows being arranged side by side and one of said universal joints being disposed between the two adjacent bellows, wherein the axial directions of the two bellows ends rigidly secured to the same hinge part diverge in a direction towards the universal joint.

2. A suction dredger as claimed in claim 1, wherein the axial direction of each bellows end forms an acute angle with the plane passing through the center lines of the two rigid pipe sections rigidly secured to the same hinge part as the bellows end.

3. A suction dredger as claimed in claim 2, wherein each bellows is arranged in an axial direction in a compressed state between the pipe sections.

4. A suction dredger as claimed in claim 1, wherein each bellows is arranged in an axial direction in a compressed state between the pipe sections.

5. In a suction dredger having at least two rigid pipe sections presenting adjacent ends disposed in spaced apart relation and means pivotally connecting said pipe sections for allowing them to assume relative angular positions with respect to each other, the combination of a flexible pipe portion connected to and extending between said ends of the pipe sections, said flexible pipe portion comprising a tubular body of elastic material and reinforcing means in said body for establishing a predetermined amount of compression of said body when the pipe portion is in a free state unconnected to said pipe sections, and the length of said pipe portion in such free state being greater than the spacing between said ends of the pipe sections whereby the pipe portion is subjected to further compression in its connected state between said pipe sections.

* * * * *